(12) United States Patent
Touhara et al.

(10) Patent No.: US 8,119,094 B2
(45) Date of Patent: Feb. 21, 2012

(54) FLUORINE STORAGE MATERIAL

(75) Inventors: Hidekazu Touhara, Ueda (JP); Yoshio Nojima, Ueda (JP); Tomohiro Isogai, Settsu (JP); Masako Yudasaka, Minato-ku (JP); Sumio Iijima, Minato-ku (JP)

(73) Assignees: Daikin Industries, Ltd., Osaka (JP); National University Corporation Shinshu University, Nagano (JP); NEC Corporation, Tokyo (JP)

( * ) Notice: Subject to any disclaimer, the term of this patent is extended or adjusted under 35 U.S.C. 154(b) by 334 days.

(21) Appl. No.: 12/159,943

(22) PCT Filed: Dec. 26, 2006

(86) PCT No.: PCT/JP2006/325908
§ 371 (c)(1),
(2), (4) Date: Jul. 2, 2008

(87) PCT Pub. No.: WO2007/077823
PCT Pub. Date: Jul. 12, 2007

(65) Prior Publication Data
US 2009/0098040 A1    Apr. 16, 2009

(30) Foreign Application Priority Data
Jan. 6, 2006  (JP) ................................. 2006-001771

(51) Int. Cl.
*C01B 31/30*   (2006.01)
*C01B 31/02*   (2006.01)
*C01B 7/00*    (2006.01)
*B01J 19/08*   (2006.01)

(52) U.S. Cl. .................... 423/445 B; 423/439; 423/500; 977/788

(58) Field of Classification Search .................... None
See application file for complete search history.

(56) References Cited

U.S. PATENT DOCUMENTS

| 2004/0009114 A1 | 1/2004 | Margrave et al. |
| 2004/0048744 A1 | 3/2004 | Iijima et al. |
| 2004/0064004 A1 | 4/2004 | Margrave et al. |

FOREIGN PATENT DOCUMENTS

| JP | 2002-326032 A | 11/2002 |
| JP | 2004059409 A * | 2/2004 |
| JP | 2005-021892 A | 1/2005 |
| JP | 2005-522398 A | 7/2005 |
| JP | 2005-273070 A | 10/2005 |
| WO | 03/099717 A1 | 12/2003 |

OTHER PUBLICATIONS

Pehrsson et al.; Thermal Fluorination and Annealing of Single-Wall Carbon Nanotubes; Journal Physical Chemistry B; 107, 5690-5695; 2003.*
Yoshiyuki Hattori et al., "Hyomen Fluorine Shushoku ni yoru Tanso Carbon Nanohorn no Kozo, Bussei Seigyo", Institute of Research and Innovation Kiyo, 2005 Nen 9 Gatsu, pp. 6 to 11, vol. 25, No. 3.
Yoshiyuki Hattori et al., "Direct Thermal Fluorination of Single Wall Carbon Nanohorns", J. Phys. Chem. B, 2004, pp. 9614-9618, vol. 108, No. 28.
Yoshio Nojima et al., "Fluorine Shushoku Carbon Nanohorn no Kozo to Seishitsu", Dai 32 Kai The Carbon Society of Japan Nenkai Yoshishu, Dec. 7, 2005, pp. 132-133.

* cited by examiner

*Primary Examiner* — Melvin Mayes
*Assistant Examiner* — Guinever Gregorio
(74) *Attorney, Agent, or Firm* — Sughrue Mion, PLLC

(57) ABSTRACT

There is provided a fluorine storage material comprising a novel fluorinated carbon nanohorn, which stores a large amount of fluorine per its unit mass, withstand repeated use for fluorine storage, and enables a high purity fluorine gas to be taken out by a safe and efficient method, and also there is provided a method of taking out a fluorine gas by applying heat to the fluorine storage material or placing the fluorine storage material in a pressure-reduced atmosphere.

4 Claims, No Drawings

FLUORINE STORAGE MATERIAL

TECHNICAL FIELD

The present invention relates to a fluorine storage material comprising fluorinated carbon nanohorn and a method of desorbing fluorine gas therefrom.

BACKGROUND ART

For synthesis of $UF_6$ in uranium enrichment in energy industries, fluorine gas has been used on a mass scale for a long period of time.

Also, fluorine gas is essential for synthesis of industrially useful functional materials such as water- and oil-repelling agent, active material for lithium battery, a dry etchant for production of semiconductors, a fluoro polymer for production of semiconductors, an additive for polymer materials and an intermediate for pharmaceuticals, and an amount of fluorine gas used therefor has been increasing year by year.

Further, it is strongly expected that use of fluorine gas as a gas for dry etching or cleaning for production of next generation semiconductor and liquid crystal, and as a gas for CVD will expand.

However, fluorine gas has extremely high reactivity and corrosiveness, and very high technical capability is required for storing and handling thereof. Therefore, significant restriction cannot help being placed on the use of fluorine gas.

Namely, in the case of storing fluorine gas in a metallic cylinder, for the purpose of securing safety, not only its pressure needs to be decreased to 2 Mpa or less, but also it cannot help being diluted previously with nitrogen or the like before being filled in the cylinder. In addition, for taking fluorine gas out of the cylinder, it is necessary to provide so many safety measures such as a valve device, a pressure reducing device and a safety device, and from this point of view, economical efficiency and productivity are lacking for the use of fluorine gas. Further there is a problem that even in the case of high purity fluorine gas subjected to sufficient refining before filling in a cylinder, it is subject to contamination due to corrosive products (for example, various metal fluorides) attributable to materials of a cylinder and a valve device, and especially in the case of application to production of semiconductors, it is necessary to take measures, for example, to separately provide refining equipment.

On the other hand, a method of directly using fluorine gas generated by electrolysis of a molten salt containing hydrogen fluoride has been employed. However, in this method, it is necessary to make thoroughgoing preparation for sufficient safety measures such as enough space for maintenance of safety and electrolyzer room provided with complete shielding, and in addition, it is necessary to secure a large-scale rectifier, refining equipment and emissions cleaning equipment and arrange operation and maintenance personnel having high technical capability at necessary places. Further, high purity fluorine gas cannot be taken out immediately after turning on electrolysis equipment, and it is necessary to carry out preliminary electrolyzing for a long period of time. In addition, there is a problem that when electrolyzing is continued for a long period of time, an anode effect occurs suddenly and frequently electrolyzing is obliged to be interrupted. Therefore, this method lacks economical efficiency and productivity.

Also, there is known a method of using a metal fluoride as a fluorine storage material and desorbing fluorine gas by thermal decomposition of the metal fluoride. For example, $K_3NiF_6$ is fluorinated to prepare $K_3NiF_7$, and by subjecting $K_3NiF_7$ to thermal decomposition, $K_3NiF_6$ is obtained and fluorine gas can be generated (trade name F-GENE, fluorine generator available from SHOWA DENKO K.K.). However, in this method, there is a problem that a fluorine storage amount per unit mass of $K_3NiF_7$ is theoretically as small as 7.0% by mass.

On the other hand, there is proposed a method of using a carbon fiber as a fluorine storage material (Ching-chen Hung, Donald Kucera, Industrial applications of graphite fluoride fibers, NASA-CP-3109-VOL-1, pp. 156-164 (1991)). Carbon fibers are lighter than metal fluorides, and even if a fluorine storage amount per unit mass of fluorinated carbon fiber is 50.7% by mass, an amount of gas to be effectively desorbed is at most 22% by mass including impurity gas. Also, there is a problem that not less than 10% by mass of fluorocarbon gases such as $CF_4$ and $C_2F_6$ are generated as impurities in the generated gases. In addition, from the view point of practical use, there is a fatal problem that carbon fibers are physically broken as fluorine storing and releasing cycles proceed, and cannot be used repeatedly.

JP2005-273070A proposes a method of fluorinating a carbon nanotube and heating the obtained fluorinated carbon nanotube to desorb fluorine gas. According to this method, while a fluorine storage amount per unit mass is increased, in the case of a fluorination reaction temperature of 200° C., a fluorine storage amount per unit mass of fluorinated carbon nanotube is at most about 52.9% by mass. Fluorine is desorbed only by heating, and there is no option of selecting a method of desorbing fluorine gas. Even in this method, there are problems that significant amounts of fluorocarbon gases such as $CF_4$ and $C_2F_6$ are generated as impurities and carbon nanotubes are physically broken as a result of repeated fluorine storing and releasing cycles, and those problems have not yet been solved.

In recent years, as a result of a rise of nano technology, a material called carbon nanohorn has been developed, and changes in structure and physical properties resulting from its fluorination have been studied as disclosed in detail in a bulletin of The New Industry Research Organization, Vol. 25, No. 3 (Serial Number 99), Sept. 2005, pp. 6-11 and Journal of Physical Chemistry B, 108 (28), 9614-9618 (2004). There are descriptions with respect to high density storing of hydrogen gas and methane gas at normal temperature, and it is indicated that chemical bond will be able to be formed by surface modification of the carbon nanohorn with fluorine and that effective molecular adsorption site will be able to be formed by controlling electronic state of the carbon nanohorn. However, there are no description and teaching as to storing of fluorine. This is because an adsorption theory of hydrogen gas and methane gas is substantially different from that of fluorine gas.

Namely, hydrogen gas and methane gas are trapped in a specific molecular potential site formed in the carbon nanohorn, and do not form chemical bond with the carbon nanohorn, in other words, it is merely a so-called physical adsorption. On the contrary, fluorine gas forms covalent bond or semi-ionic bond with carbon atoms constituting the carbon nanohorn, namely a so-called chemical adsorption. The both are definitely different from each other in the mentioned point and cannot be discussed on the same level.

Further, on the way of fully studying electrochemical properties of fluorinated carbon nanohorn, as disclosed in a manuscript of the 32nd meeting of The Carbon Society of Japan, Dec. 7, 2005, pp. 132-133, it has been made clear that in the case of using carbon nanohorn as an active material for positive electrode of lithium battery, there are characteristics that discharging reaction proceeds by uniform solid phase reaction, an initial electromotive force is as high as 4.2 V, and not only energy density is high, but also an electromotive force is gradually decreased as discharging proceeds. This indicates superiority in practical use on batteries in that not only a service life of lithium battery is made longer, but also remaining battery capacity can be always monitored, thereby enabling sudden running down of the battery to be avoided. However, there is no teaching at all with respect to storing and releasing of fluorine gas.

DISCLOSURE OF INVENTION

In view of the present situation mentioned above, it is an object of the present invention to provide a safe and efficient fluorine storage material and a method of taking out high purity fluorine gas from the fluorine storage material.

The fluorine storage material of the present invention is featured by comprising fluorinated carbon nanohorn.

Fluorine gas can be taken out by applying heat to the fluorinated storage material of the present invention or placing it in a pressure-reduced atmosphere. It is a matter of course that heat may be applied in a pressure-reduced atmosphere.

BEST MODE FOR CARRYING OUT THE INVENTION

The fluorinated carbon nanohorn of the present invention can be obtained by fluorinating a nano carbon material which is comprised of secondary particles consisting of carbon atom and synthesized by laser abrasion method, and having a length of about 10 nm to about 20 nm, a horn end diameter of about 2 nm to about 3 nm, and a horn size like a flower of dahlia of about 50 nm to about 100 nm.

Fluorination of carbon nano horn can be carried out by known methods disclosed in the bulletin of The New Industry Research Organization, Vol. 25, No. 3 (Serial Number 99), Sept. 2005, pp. 6-11, Journal of Physical Chemistry B, 108 (28), 9614-9618 (2004), and the manuscript of the 32nd meeting of The Carbon Society of Japan, Dec. 7, 2005, pp. 132-133. Namely, fluorination may be carried out by putting carbon nano horn in a reactor made of a material having corrosion resistance to fluorine at a reaction temperature such as nickel, a nickel-containing alloy or graphite, sealing the reactor and then introducing, for example, fluorine gas thereto.

A fluorine gas pressure may be selected within a range preferably from 0.002 to 1.0 MPa, more preferably from 0.005 to 0.5 MPa, in consideration of productivity, economical efficiency and safety. If the pressure is too low, fluorination speed becomes slow, and if the pressure is too high, a large-scaled reactor is required, both of which are not preferable. It is preferable that purity of gas used for the fluorination is higher, and $F_2$ concentration of the gas for fluorination is not less than 1.0% by mass and the gas may be diluted with not more than 99% by mass of nitrogen, argon or helium.

In addition, the gas may contain fluorocarbon, for example, inorganic fluoride such as hydrogen fluoride, nitrogen trifluoride or iodine pentafluoride, oxygen or steam. Especially hydrogen fluoride may be positively added in a minute amount since it is known that there is an effect of accelerating a reaction speed due to its catalytic effect.

The fluorination may be carried out batchwise in a reactor having a sufficient volume, may be of semi-batch type undergoing the fluorination while suitably replacing by fluorine gas or further may be carried out by a flow method. When a large amount of carbon nanohorn is fluorinated at the same time, it is preferable to provide a proper stirring mechanism on a reactor to make the reaction uniform. With respect to the stirring mechanism, there is employed a method of stirring with various stirring blades, a method of mechanically rotating or vibrating a reactor or a method of fluidizing a powder layer of carbon nanohorn by flowing a gas. Since there is a fear of breaking a structure of carbon nanohorn in the case of excessive stirring, attention should be paid not to cause excessive stirring.

A reaction temperature may be selected within a range from −100° C. to 500° C. in consideration of productivity, economical efficiency and safety, and the reaction temperature is more preferably 35° to 300° C. When the reaction temperature is too low, fluorination speed 5 is decreased, and when the reaction temperature is too high, a decomposition reaction of the carbon nanohorn is accelerated. Therefore, attention should be paid to the reaction temperature. A reaction time depends on a reaction method and reaction conditions and is not limited especially, and it is desirable to set the reaction time within a range from 10 seconds to 100 hours. If the reaction time is too short, it becomes difficult to sufficiently carry out the fluorination, and efficiency of use of carbon nanohorn tends to be lowered. If the reaction time is too long, not only a decomposition reaction is accelerated, but also industrial production efficiency is lowered.

Carbon nanohorn as a starting material may be optionally subjected to needed pre-treatment. Example of the pre-treatment is a hole-opening treatment to be carried out in an oxygen atmosphere at high temperature for hole-opening of the carbon nanohorn.

A temperature for the above-mentioned hole-opening treatment is preferably 300° to 600° C., more preferably 500° to 550° C. A treating time is preferably 10 to 15 minutes.

A storage amount of fluorine (fluorination amount) can be selected within a range of a fluorine atom to carbon atom ratio F/C of from 0.1 to 1.1 (being equivalent to a fluorine content of 13.7 to 63.5% 25 by mass converted based on a unit mass of the fluorinated carbon nanohorn) by controlling a fluorine gas pressure, a reaction temperature, a reaction time, an additional gas and a pre-treatment method of carbon nanohorn. For example, by making a fluorine gas pressure and a reaction temperature higher and making a reaction time longer, the storage amount of fluorine (fluorination amount) can be increased.

In the thus obtained fluorinated carbon nanohorn, covalent bond or semi-ionic bond is formed by carbon atoms constituting the carbon nanohorn and fluorine atoms, and the fluorinated carbon nanohorn is stable at normal temperature at normal pressure, and is safe since an amount of releasing fluorine gas is very small.

For taking out or desorbing fluorine gas from the fluorinated carbon nanohorn, firstly a method of heating the fluorinated carbon nanohorn is raised.

By applying heat, bonding of the carbon atom constituting the carbon nanohorn to the fluorine atom is cut (de-fluorination reaction), and fluorine gas ($F_2$) is released. Fluorine gas can be desorbed more effectively by holding the carbon nanohorn at a temperature higher than the fluorination temperature for preparing the fluorinated carbon nanohorn. In addition, fluorine gas can be desorbed further effectively in a pressure-reduced atmosphere even at a temperature lower than the fluorination temperature. Specifically the heating temperature may be selected in consideration of a necessary fluorine gas pressure and fluorine gas desorption speed.

One of the features of the present invention is that an amount of impurity fluorocarbon gas contained in the desorbed fluorine gas is very small. In the case of fluorinated carbon nanotube proposed in JP2005-273070A, fluorocarbon gases such as $CF_4$ and $C_2F_6$ being decomposition products occupy a large portion of gas desorbed by heating. On the contrary, in the present invention, $F_2$ concentration of the fluorine gas desorbed by heating is not less than 99% by mass (except an atmosphere gas), preferably not less than 99.5% by mass, more preferably not less than 99.9% by mass, especially preferably not less than 99.99% by mass, and thus a high purity fluorine gas is obtained.

Also, according to the present invention, high purity fluorine gas can be desorbed (de-fluorination reaction) by placing the fluorinated carbon nanohorn in a pressure-reduced atmosphere.

When a reduced pressure is as close to a vacuum as possible, fluorine gas can be desorbed more effectively. The degree of pressure reduction may be selected in consideration of a necessary fluorine amount, gas pressure and fluorine gas desorption speed. The degree of pressure reduction of a reactor in the above-mentioned de-fluorination is usually preferably not more than 100 kPa, and a vacuum degree of about 0.5 kPa with an oil-sealed rotary vacuum pump is more preferable.

According to this pressure reducing method, since heating is not necessary, not only higher safety and energy efficiency are assured, but also an amount of fluorocarbon gases being impurities can be further reduced.

Further, fluorine gas can be desorbed more efficiently by heating the fluorinated carbon nanohorn in a pressure-reduced atmosphere.

It is possible to desorb not less than 99% by mass of the stored fluorine (fluorinated amount) by using the fluorine storage material of the present invention by the method of the present invention.

The fluorine storage material of the present invention can store a large amount of fluorine gas and makes it possible to take out high purity fluorine gas safely and efficiently, and therefore, has high applicability in various industries requiring fluorine gas. Especially the fluorine storage material can be expected to be used in various processes in semiconductor application using fluorine gas and in accurate synthesizing reactions for intermediates of pharmaceuticals using fluorine gas.

EXAMPLE

The present invention is then explained by means of examples, but is not limited to them.

Example 1

(1) Storing of Fluorine (Fluorination of Carbon Nanohorn)

Carbon nanohorn is a nano carbon material which is comprised of secondary particles consisting of carbon atom and synthesized by laser abrasion method, and having a length of about 10 nm to about 20 nm, a horn end diameter of about 2 nm to about 3 nm, and a horn size like a flower of dahlia of about 50 nm to about 100 nm. Fluorinated carbon nanohorn used is one having purity of not less than 90% by mass (available from NEC CORPORATION).

About 50 mg of this carbon nanohorn was placed on a nickel dish and put in a reactor (inside volume of 360 $cm^3$) made of nickel, followed by sealing of the reactor. First, the inside pressure of the reactor was reduced to 0.5 kPa with an oil-sealed rotary vacuum pump connected via a liquid nitrogen trap, and the reactor was heated to 250° C. When the temperature inside the reactor became stable, fluorine gas (purity of 99.7% by mass or more, available from DAIKIN INDUSTRIES, LTD.) was introduced at a flow rate of not more than 30 ml/min with a cylinder until the fluorine gas pressure inside the reactor reached 0.1 MPa, and the reactor was left for 24 hours to continue reaction. After completion of the reaction, the reactor was cooled to 35° C. or lower and then high purity argon gas was flowed at a flow rate of not more than 100 ml/min. After sufficiently replacing fluorine gas remaining in the reactor with argon gas, the reactor was opened in a dry box filled with argon gas atmosphere. Thus, deep green fluorinated carbon nanohorn having a mass of about 100 mg was obtained and stored in a glass vessel.

The obtained fluorinated carbon nanohorn was pressed on an indium foil, and spectra of C1s and F1s were measured using magnesium counter electrode at a tube voltage of 8 kV and a tube current of 30 mA with a X-ray photoelectron spectrometer (model 5600 available from ULVAC-PHI, Incorporated), and integrated intensities thereof were multiplied by a correction factor obtained from a photo-ionized cross-sectional area to determine a surface fluorine atom to carbon atom ratio F/C. The F/C was 0.66. On the other hand, a fluorine atom to carbon atom ratio F/C obtained from a mass change after the reaction was 0.63.

(2) Desorption of Fluorine Gas 63 mg of the fluorinated carbon nanohorn synthesized in (1) above was introduced into an about 300 ml nickel reactor previously subjected to passivation treatment at 420° C. for 24 hours by filling fluorine gas in it and sealing it. Then after the reactor was sealed, its inner pressure was reduced to 0.5 kPa with an oil-sealed rotary vacuum pump connected to the reactor via a liquid nitrogen trap, and the reactor was left for 12 hours.

Then, after the reactor was once heated to 400° C., it was left at room temperature (about 25° C.) for 24 hours. The inner pressure of the reactor increased to about 40 kPa, and releasing of gas was confirmed. Gases obtained three minutes after, one hour after and 24 hours after, respectively were introduced to a gas cell (diameter 15 mm, length 80 mm, volume 1.8 ml) having a window made of a monocrystal of barium fluoride, and absorption spectra derived from fluorine gas having a wavelength of 283 nm was analyzed with a spectrophotometer for ultraviolet and visible region (model UV1600 available from Shimadzu Corporation), using an analytical curve previously prepared, to determine a generated fluorine gas amount. Determination of components other than fluorine gas was carried out using a Fourier transform infrared spectrophotometer (model MB100 available from BOMEN), and it was confirmed that minute amounts of $CF_4$, $SiF_4$, $H_2O$, $CO_2$, CO and HF gases were contained. Further, after finally generated gas was passed through an alumina-filled tube to remove fluorine gas and HF gas, the resultant gas was analyzed using a gas chromatography-quadrupole mass spectrometer (model JMS-Q1000GC-K9 available from JEOL Ltd.). The resultant gas was one mainly comprising nitrogen, oxygen and argon which were considered to have been adsorbed during the operation, and presence of perfluorocarbon gases was not recognized at all.

The results obtained by the above-mentioned analyses are collectively shown in Table 1.

TABLE 1

| | Inside pressure of reactor (kPa) | F$_2$ (vol %) | SiF$_4$ (ppm) | CF$_4$ (ppm) | CO$_2$ (ppb) | CO (ppm) | H$_2$O (ppm) | HF (ppm) | N$_2$ + O$_2$ + Ar (vol %) |
|---|---|---|---|---|---|---|---|---|---|
| 3 minutes after | 1.2 | 32.5 | 19.6 | 0 | 0.09 | 0 | 204 | 0 | 67.5 |
| one hour after | 2.8 | 14.2 | 329 | 7.3 | 0.60 | 75.2 | 609 | 0 | 84.3 |
| 24 hours after | 36.7 | 7.0 | 19 | 2.8 | 0.27 | 35.2 | 262 | 59.2 | 93.0 |

It can be seen from the above-mentioned results that the generated gas comprises almost fluorine gas except nitrogen, oxygen, argon and moisture which are considered to have been adsorbed during the operation, and SiF$_4$ generated due to corrosion of the glass vessel used for storage, and that fluorocarbon gas generated by decomposition of carbon nanohorn is only a very minute amount of CF$_4$.

An amount of fluorine gas generated from 63 mg of fluorinated carbon nanohorn having a F/C rate of 0.66 (fluorine content of 51.1% by mass) was determined by analyzing absorption spectra derived from fluorine gas having a wavelength of 283 nm with a spectrophotometer for ultraviolet and visible region, using an analytical curve previously prepared. As a result, an accumulated fluorine amount converted based on standard environmental temperature and pressure (100 kPa, 25° C.) was 26 cm$^3$. When an equation of state of ideal gas is applied thereto, it indicates that 40 mg of fluorine gas larger than a theoretical amount (32 mg) has been recovered. When taking an analytical error of a F/C rate of a fluorinated carbon nanohorn and an error in gas analysis into consideration, it can be said that recovery percentage of fluorine gas reaches nearly 100% by mass.

In addition, according to photographs taken with a transmission electron microscope, no change in shape is recognized on any of the carbon nanohorn before the reaction, the fluorinated carbon nanohorn and the carbon nanohorn after the recovery of fluorine gas, and the carbon nanohorn can withstand repeated use for fluorine storage.

INDUSTRIAL APPLICABILITY

The present invention can provide a fluorine storage material which stores a large amount of fluorine per its unit mass, withstand repeated use for fluorine storage, and enables a high purity fluorine gas to be taken out by a safe and efficient method.

The invention claimed is:

1. A method of taking out fluorine gas by heating a fluorinated carbon nanohorn in a pressure-reduced hydrogen atmosphere of 0.5 kPa or less.

2. The method of claim 1, wherein the heating of the fluorinated carbon nanohorn is carried out at a temperature lower than a fluorination temperature.

3. The method of claim 1, wherein no change in shape of the carbon nanohorn is observed by transmission electron microscope upon heating the fluorinated carbon nanohorn to take out fluorine gas.

4. The method of claim 1, wherein the fluorine gas taken out by heating the fluorinated carbon nanohorn has a concentration, excepting atmospheric gas, of not less than 99% by mass.

* * * * *